(12) United States Patent
Helvick

(10) Patent No.: US 8,401,468 B2
(45) Date of Patent: Mar. 19, 2013

(54) METHOD AND SYSTEM FOR FACILITATING SCHEDULING USING A MOBILE DEVICE

(75) Inventor: Richard Eric Helvick, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 969 days.

(21) Appl. No.: 12/154,867

(22) Filed: May 28, 2008

(65) Prior Publication Data

US 2009/0298426 A1    Dec. 3, 2009

(51) Int. Cl.
*H04B 5/00* (2006.01)

(52) U.S. Cl. ......... 455/41.1; 370/342; 340/5.1; 340/5.7; 705/14.1; 705/1.1; 705/14.65; 705/5; 715/751; 715/752; 704/270; 345/173

(58) Field of Classification Search ................ 370/342; 340/5.1, 5.7; 705/14.1, 1.1, 14.65, 8, 5; 715/751; 715/752; 704/270; 345/963, 700, 710, 733, 345/741, 173

See application file for complete search history.

(56) References Cited

U.S. PATENT DOCUMENTS

| | | | |
|---|---|---|---|
| 6,614,450 B1 * | 9/2003 | Vossler | 715/751 |
| 7,667,646 B2 * | 2/2010 | Kalliola et al. | 342/417 |
| 2004/0107435 A1 * | 6/2004 | Anzai et al. | 725/35 |
| 2006/0062367 A1 | 3/2006 | Christenson et al. | 379/202.01 |
| 2007/0162315 A1 | 7/2007 | Hodges | 705/8 |
| 2007/0218837 A1 * | 9/2007 | Lessing et al. | 455/41.2 |
| 2007/0299966 A1 | 12/2007 | Crawford et al. | 709/224 |
| 2008/0014966 A1 * | 1/2008 | Chakraborty et al. | 455/456.4 |
| 2008/0046570 A1 * | 2/2008 | Abel | 709/227 |
| 2008/0084860 A1 * | 4/2008 | Bloebaum et al. | 370/342 |
| 2008/0290987 A1 * | 11/2008 | Li | 340/5.1 |
| 2009/0083149 A1 * | 3/2009 | Maekawa et al. | 705/14 |
| 2009/0210494 A1 * | 8/2009 | Fisher et al. | 709/205 |
| 2010/0328025 A1 * | 12/2010 | Razdan | 340/5.7 |
| 2011/0165859 A1 * | 7/2011 | Wengrovitz | 455/411 |

* cited by examiner

*Primary Examiner* — April G Gonzales
(74) *Attorney, Agent, or Firm* — Scot A. Reader

(57) ABSTRACT

A method and system for facilitating scheduling using a mobile device and near field communication (NFC) allows a user of a mobile device integrated with an NFC unit while in the vicinity of a shared resource that is presently unavailable or a residence of a social contact who is presently not home to review a schedule for the shared resource or social contact, and in the case of a shared resource reserve the shared resource at a later time.

14 Claims, 6 Drawing Sheets

_US 8,401,468 B2_

METHOD AND SYSTEM FOR FACILITATING SCHEDULING USING A MOBILE DEVICE

BACKGROUND OF THE INVENTION

The present invention relates to scheduling and, more particularly, to a method and system for invoking a mobile device to facilitate scheduling.

Corporate and school campuses have many shared resources, such as meeting and study rooms, exercise, laboratory and recreational facilities and computing, counseling, library, technical support, tutoring and training resources. Since such campuses are often self-contained and employees and students often spend large blocks of time on campus, they often bike or walk to locations of shared resources they wish to use, which involves considerable travel time. If upon arrival at a location of a shared resource the resource is discovered to be unavailable, there is often no way for the employee or student to perform an on-site review of an online schedule for the resource or allow the employee or student to reserve the resource at a later time, and the trip is wasted.

A similar problem can arise when a person makes an unannounced visit to the place of residence of a social contact (e.g. friend). If upon arrival at the place of residence the social contact is not home, there is often no way for the person to perform an on-site review of the social contact's schedule to see where he/she is and what time he/she will return home.

SUMMARY OF THE INVENTION

The present invention provides a method and system for facilitating scheduling using a mobile device and near field communication (NFC) that allows a user of a mobile device integrated with an NFC unit while in the vicinity of a shared resource that is presently unavailable or a residence of a social contact who is presently not home to a review a schedule for the shared resource or the social contact, and in the case of a shared resource reserve the resource at a later time.

In one aspect of the invention, a method for facilitating scheduling using a mobile device and NFC comprises the steps of bringing a mobile device into proximity with a NFC station whereby a NFC connection is established, downloading from the NFC station to the mobile device via the NFC connection schedule location information for an entity, downloading to the mobile device a schedule for the entity using the schedule location information and displaying on the mobile device the schedule.

In some embodiments, the method further comprises the step of uploading from the mobile device to the NFC station an access credential.

In some embodiments, the NFC station and the entity are collocated.

In some embodiments, the schedule location information comprises a uniform resource locator (URL).

In some embodiments, the entity is a shared resource.

In some embodiments, the schedule indicates times when the shared resource is available for reservation.

In some embodiments, the method further comprises the step of uploading from the mobile device a reservation request for the shared resource.

In some embodiments, the shared resource is one of a study room, exercise facility, lab facility, recreational facility, computing resource, counseling resource, library resource, technical support resource, tutoring resource or training resource.

In some embodiments, the entity is a social contact of a user of the mobile device.

In another aspect of the invention, a mobile device comprises a NFC interface, a wireless network interface, a user interface and a processor communicatively coupled with the NFC interface, the wireless network interface and the user interface, wherein under control of the processor the mobile device displays on the user interface a schedule for an entity downloaded via the wireless network interface using schedule location information for the entity downloaded from a NFC station via the NFC interface.

In some embodiments, under control of the processor the mobile device uploads to the NFC station via the NFC interface an access credential.

In some embodiments, the NFC station and the entity are collocated.

In some embodiments, the schedule location information comprises a URL.

In some embodiments, under control of the processor the mobile device uploads via the wireless network interface a request to reserve the entity.

In some embodiments, the entity is a shared resource.

In some embodiments, the entity is a social contact of a user of the mobile device.

In another aspect of the invention, a NFC station comprises a NFC interface and a processor communicatively coupled with the NFC interface, wherein under control of the processor the NFC station downloads to a mobile device via the NFC interface schedule location information for an entity collocated with the NFC station.

In some embodiments, the NFC station downloads the schedule location information upon validating an access credential uploaded from the mobile device via the NFC interface.

In some embodiments, the entity is one of a shared resource or a social contact of a user of the mobile device.

In some embodiments, the schedule location information comprises a URL of a schedule for the entity.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
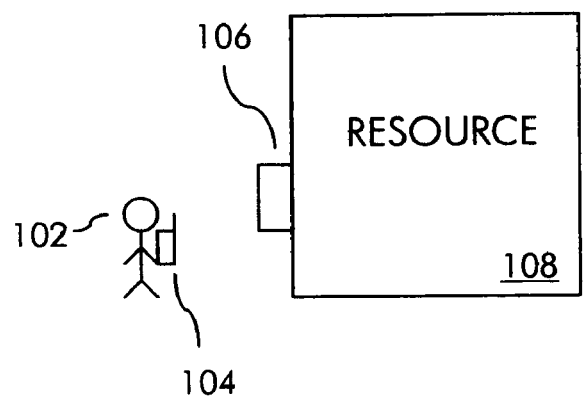
FIG. 1 shows an NFC station that is collocated with a shared resource.

FIG. 1 shows an NFC station 106 that is collocated with a shared resource 108 in some embodiments of the invention.

Shared resource 108 may be a meeting room, study room, exercise facility, laboratory facility, recreational facility, computing resource, counseling resource, library resource, technical support resource, tutoring or training resource and may reside on a corporate or school campus, for example. NFC station 106 is shown mounted to the exterior of shared resource 108, but in other embodiments a NFC station may be free-standing near shared resource 108. Also in the vicinity of shared resource 108 is a user 102 who wishes to use shared resource 108. User 102 may be, for example, a corporate or school employee or student who has biked or walked to shared resource 108. User 102 possesses an Internet-capable and NFC-capable mobile device 104 which may be, for example, a cell phone, personal data assistant (PDA) or notebook computer.

Figure 2:
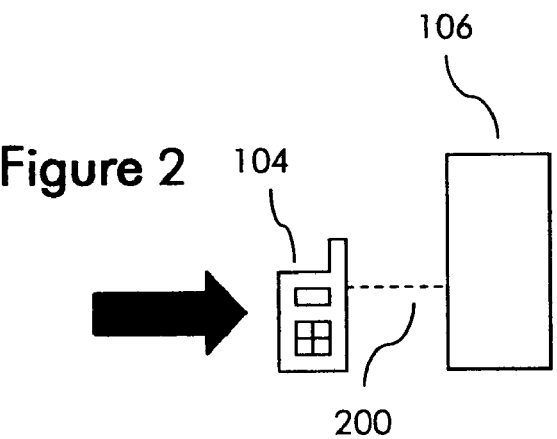
FIG. 2 shows a mobile device brought into proximity with a NFC station whereby a NFC connection is established.

FIG. 2 shows mobile device 104 brought into proximity with NFC station 106 whereby a NFC connection 200 is established. When user 102 discovers that shared resource 108 is presently unavailable, user 102 brings mobile device 104 into proximity with NFC station 106 by moving mobile device 104 near NFC station 106. NFC units on mobile device 104 and NFC station 106 then automatically establish NFC connection 200 using an NFC protocol. Once NFC connection 200 has been established, NFC station 106 downloads information about shared resource 108 to mobile device 104 via NFC connection 200. The downloaded information about shared resource 108 includes a URL of a webpage having a schedule for shared resource 108. After the information about shared resource 108 is downloaded, NFC connection 200 is terminated, either by moving mobile device 104 away from NFC station 106 or on command of mobile device 104 or NFC station 106.

Figure 3:
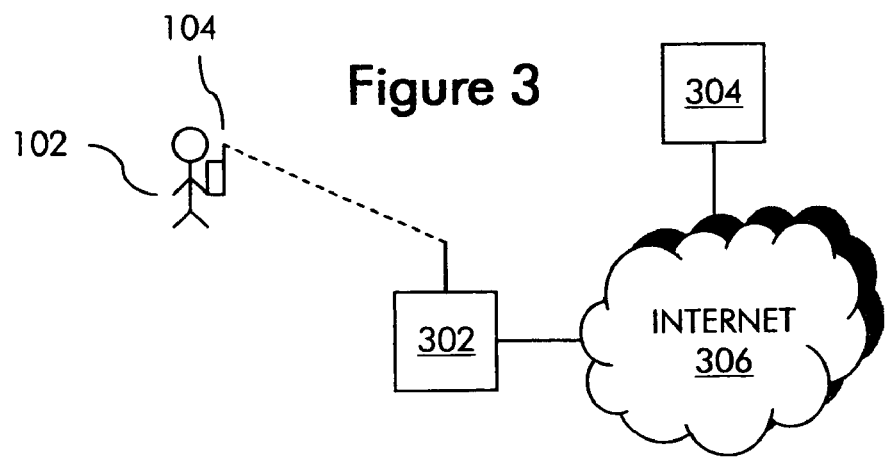
FIG. 3 shows a communication system.

User 102 next applies the resource schedule URL downloaded from NFC station 106 to review the schedule for shared resource 108 and possibly reserve shared resource 108. FIG. 3 shows a communication system that user 102 invokes for such purposes in some embodiments of the invention. User 102 establishes using mobile device 104 a wireless communication link to an access device 302, which may be a cellular base station, an IEEE 802.11 (WiFi) access point or an IEEE 802.16 (WiMAX) base station, for example, that has an uplink to the Internet 306. Mobile device 104 then using a web browser on mobile device 104 and the resource schedule URL downloaded from NFC station 106 navigates to a schedule for shared resource 108 hosted on web server 304 and reviews the schedule on mobile device 104. User 102 then can interact with a schedule management system hosted on web server 304 to reserve shared resource 108 at a time when shared resource 108 is available and that is also convenient for user 102. Such interaction includes uploading a reservation request to the schedule management system and receiving a reservation confirmation from the schedule management system. The schedule management system adds the reservation made by user 102 to the schedule.

In some embodiments, NFC station 106 requires authentication of user 102 and/or mobile device 104. In these embodiments, an access credential is uploaded from mobile device 104 to NFC station 106 via NFC connection 200. The access credential may be, for example, one or more of a user name, password, personal identification number, mobile device identifier or system access code. NFC station 106 attempts to validate the access credential and downloads the resource schedule URL to mobile device 104 only upon successful validation of the access credential.

In some embodiments, the schedule management system hosted on web server 304 independently authenticates user 102 or mobile device 104 through validation of an access credential before downloading the schedule for shared resource 108 to mobile device 104 and/or accepting a reservation from user 102.

In some embodiments, NFC station 106 and/or the schedule management system on web server 304 uploads the access credential without user intervention so that user 102 does not have to remember or input the access credential.

In some embodiments, mobile device 104 upon receiving the resource schedule URL opens the web browser on mobile device 104 and navigates to the schedule for shared resource 108 hosted on web server 304 without user intervention so that user 102 does not have to expend effort on these actions.

In some embodiments, information flows between mobile device 104 and web server 304 are encrypted to protect the privacy of exchanged information.

In some embodiments, a user may invoke a client application other than a web browser to facilitate scheduling. For example, a mobile device may support a client application that is dedicated to facilitating scheduling as described herein.

Figure 4:
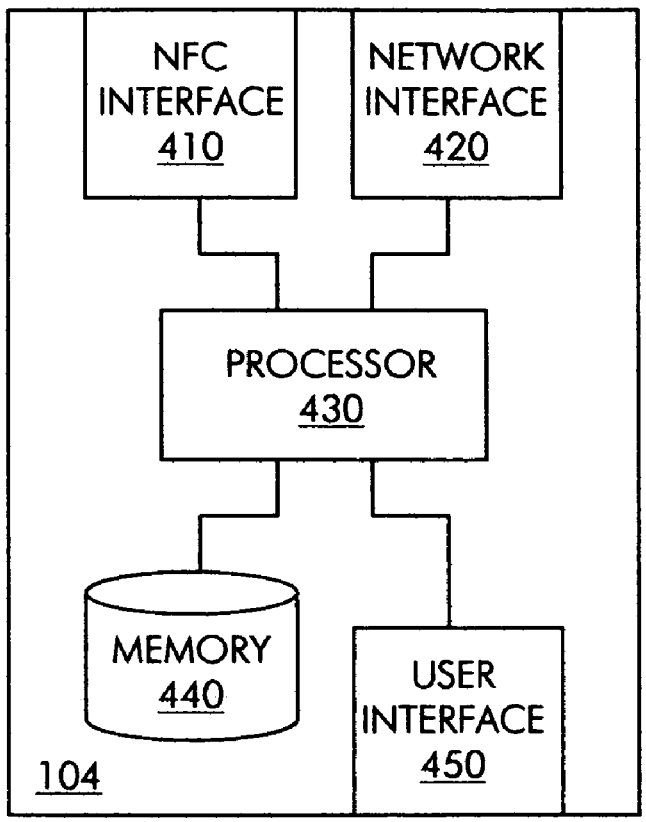
FIG. 4 shows hardware elements of a mobile device.

Turning now to FIG. 4, hardware elements of mobile device 104 are shown. Mobile device 104 has a NFC interface 410, a wireless network interface 420, a memory 440 and a user interface 450, all of which are communicatively coupled with a processor 430.

NFC interface 410 is a very short range wireless communication interface for transmitting and receiving information to/from NFC station 106 over NFC connection 200. In some embodiments, NFC interface 310 operates in the radio frequency (RF) bond at or near 13.56 MHz at a speed of between 106 and 424 kilobits per second over an operating distance of less than twenty centimeters.

Wireless network interface 420 is a communication interface for transmitting and receiving information to/from access device 302 over a wireless communication link. Wireless network interface 420 may be, for example, a cellular network interface, a WiFi interface or a WiMAX interface.

Figure 5:
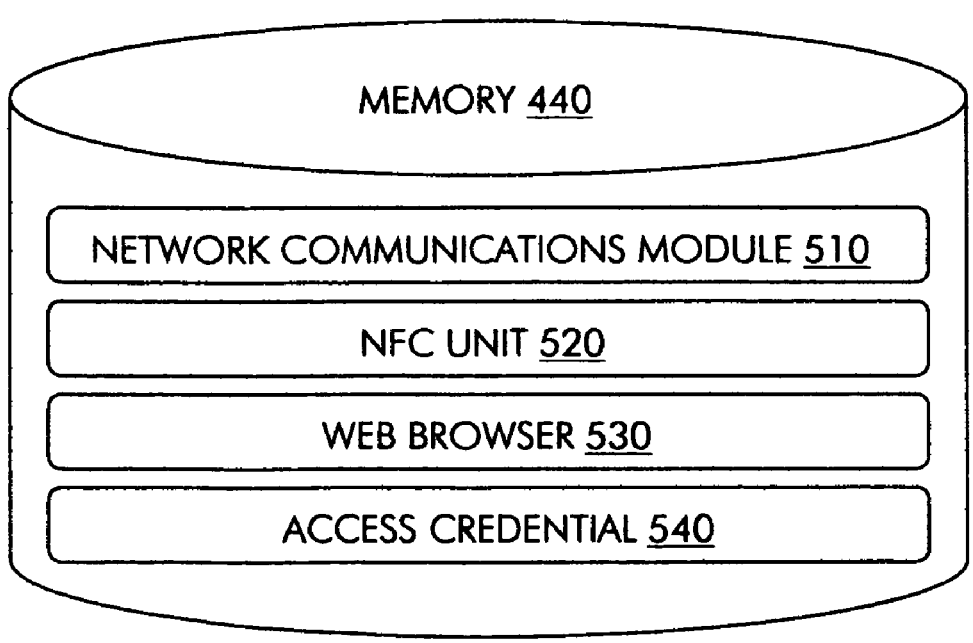
FIG. 5 shows software elements of a mobile device.

Processor 430 executes in software operations supported by mobile device 104. Turning to FIG. 5, software elements of mobile device 104 that are executable by processor 430 are shown to include a network communications module 510, a NFC unit 520 and a web browser 530. Memory 440 stores the software elements that are executable by processor 430. Memory 440 also includes an access credential store 540. Memory 440 includes one or more random access memories (RAM) and one or more read only memories (ROM).

Network communications module 510 establishes, tears-down and manages a wireless communication link with access device 302 via wireless network interface 420. Mobile device 104 uses the link to interact with a schedule management system on web server 304 to download a schedule for shared resource 108 and/or enable reservation of shared resource 108.

NFC unit 520 establishes, tears-down and manages NFC connection 200 made via NFC interface 410 with NFC station 106 when mobile device 104 is in range of NFC station 106. NFC connection 200 has an operating distance of less than twenty centimeters. In some embodiments, NFC unit 520 operates as an initiator device that controls the terms of information exchange over NFC connection 200, including choosing an initial communication speed and communication mode. In other embodiments, NFC unit 520 operates as a target device that exchanges information on NFC connection 200 established with NFC station 106 under terms of information exchange controlled by NFC station 106. NFC unit 520 implements a modulation and bit encoding scheme that depends on the speed and terminates NFC connection 200 on command or when mobile device 104 is no longer in range of NFC station 106. NFC unit 520 supports an active communication mode in which the initiator device and the target device each generate their own RF field to transmit information on NFC connections, and also supports a passive communication mode in which the initiator device generates an RF field while the target device uses load modulation to transfer information. NFC unit 520 implements a listen before talk policy in which mobile device 104 listens on the carrier frequency before transmitting and starts transmitting only if no other device is detected transmitting. Information exchanged on NFC connection 200 includes a resource schedule URL downloaded from NFC station 106 to mobile device 104 and, in some embodiments, an access credential 540 uploaded from mobile device 104 to NFC station 106 to validate user 102 and/or mobile device 104.

Web browser 530 supports interaction between mobile device 104 and web server 304 that hosts a schedule management system and a web page having a schedule for shared resource 108. Web browser 530 requests download of the web page having the schedule for shared resource 108 using the resource schedule URL supplied by NFC station 106 over NFC connection 200, renders the downloaded web page on user interface 450 and supports interaction of user 102 via user interface 450 with the schedule management system hosted on web server 304 to reserve shared resource 108.

Access credential 540 is a security credential, such as one or more of a user name, password, personal identification number, mobile device identifier or system access code that is uploaded and applied by NFC station 106 and/or web server 304 to validate that user 102 and/or mobile device 104 are authorized before providing access to services.

User interface 450 receives inputs from user 102 via one or more input devices and displays outputs to user 102 via one or more output devices. Output devices include a display, such as a liquid crystal display (LCD), organic light emitting diode (OLED) display capable of rendering a web page downloaded from web server 304 having a schedule for shared resource 108. Input devices include, for example, a finger or stylus-operated touch screen, a scroll wheel or ball, a keypad and/or voice command module, capable of navigating to the web page and manipulating the web page rendered on the display.

Figure 6:
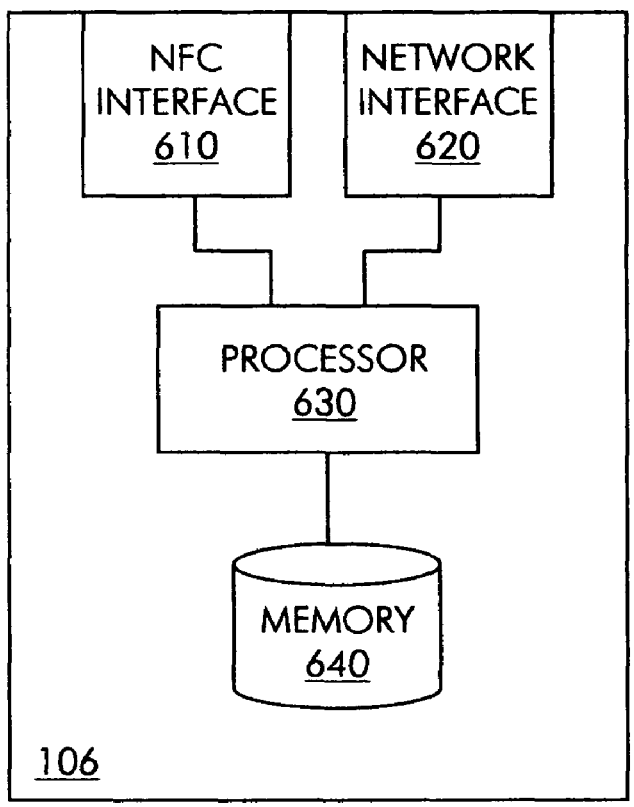
FIG. 6 shows hardware elements of a NFC station.

Turning now to FIG. 6, hardware elements of NFC station 106 are shown. NFC station 106 has a NFC interface 610, a network interface 620 and a memory 640, all of which are communicatively coupled with a processor 630.

NFC interface 610 is a very short range wireless communication interface for transmitting and receiving information to/from mobile device 104 over NFC connection 200. In some embodiments, NFC interface 610 operates in the RF bond at or near 13.56 MHz at a speed of between 106 and 424 kilobits per second over an operating distance of less than twenty centimeters.

Network interface 620 is a wired or wireless communication interface for receiving configuration information over a wired or wireless communication link. Network interface 620 may be, for example, a cellular network interface, a wired Ethernet interface, a WiFi interface or a WiMAX interface. Configuration information received via network interface 620 includes, for example, updates to software and data stored in memory 640.

Figure 7:
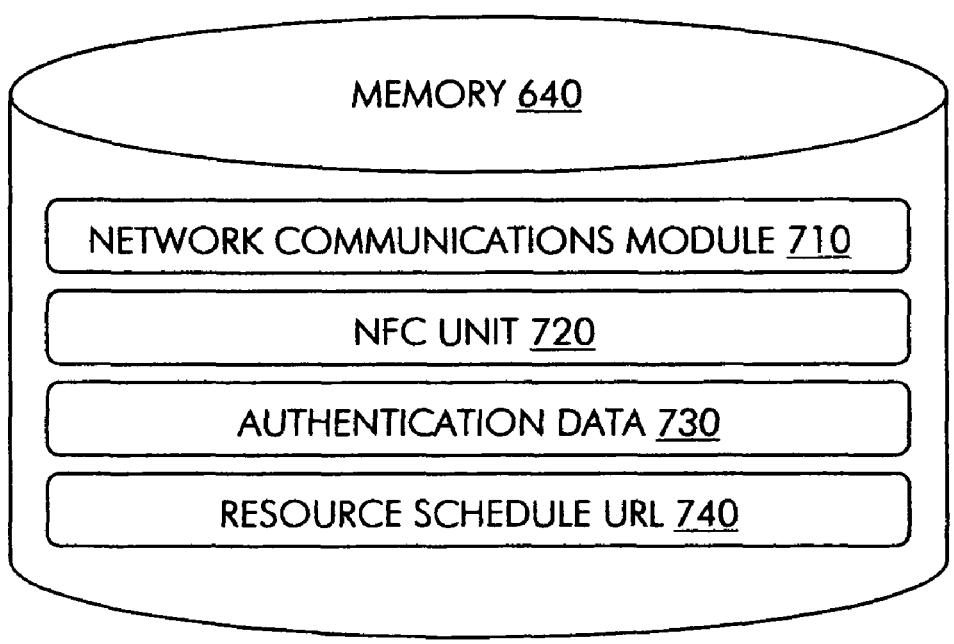
FIG. 7 shows software elements of a NFC station.

Processor 630 executes in software operations supported by NFC station 106. Turning to FIG. 7, software elements of NFC station 106 that are executable by processor 630 are shown to include a network communications module 710 and a NFC unit 720. Memory 640 stores the software elements that are executable by processor 630. Memory 640 also includes authentication data 730 and a resource schedule URL 740. Memory 640 includes one or more RAM and one or more ROM.

Network communications module 710 establishes, tears-down and manages a wired or wireless communication link with a network administrator computer via network interface 620. NFC station 106 uses the link to interact with a network administrator to configure and update NFC station 106, including configuring and updating software, authentication data 730 and resource schedule URL 740.

NFC unit 720 establishes, tears-down and manages NFC connection 200 made via NFC interface 610 with mobile device 104 when mobile device 104 is in range of NFC station 106. In some embodiments, NFC unit 720 operates as an initiator device that controls the terms of information exchange, including choosing an initial communication speed and communication mode, on NFC connection 200 established with mobile device 104. In other embodiments, NFC unit 720 operates as a target device that exchanges information on NFC connection 200 under terms of information exchange controlled by mobile device 104. NFC unit 720 implements a modulation and bit encoding scheme that depends on the speed and terminates NFC connection 200 on command or when mobile device 104 is no longer in proximity with NFC station 106. NFC unit 720 supports an active communication mode in which the initiator device and the target device each generate their own RF field to transmit information on NFC connections, and also supports a passive communication mode in which the initiator device generates an RF field while the target device uses load modulation to transfer information. NFC unit 720 implements a listen before talk policy in which NFC unit 720 listens on the carrier frequency before transmitting and starts transmitting only if no other device is detected transmitting. Information exchanged on NFC connection 200 includes resource schedule URL 740 downloaded from NFC station 106 to mobile device 104 for linking to a web page having a schedule for shared resource 108 and, in some embodiments, an access credential 540 uploaded from mobile device 104 to NFC station 106 that is applied by NFC station 106 to validate user 102 and/or mobile device 104.

Authentication data 730 are data that are applied by NFC station 106 to validate user 102 and/or mobile device 104 before providing access to services of NFC station 106, including provision of resource schedule URL 740. Authentication data 730 includes a list of authorized users and/or mobile devices that are identified in authentication data 730 by one or more of user name, password, personal identification number, mobile device identifier or system access code. NFC unit 720 validates access by comparing for a match access credential 540 uploaded from mobile device 104 via NFC connection 200 against the list of authorized users and/or mobile devices in authentication data 730. If a match is found, user 102 and/or mobile device 104 are authorized and resource schedule URL 740 is downloaded via NFC connection 200 to mobile device 104. If a match is not found, user 102 and/or mobile device 104 are not authorized and download of resource schedule URL 740 is inhibited.

Resource schedule URL 740 identifies a network location of a web page that has a schedule for shared resource 108 and allows retrieval of the web page using a web browser. In the embodiments shown, the web page is hosted on web server 304 and is retrieved using web browser 530 on mobile device 104 after resource schedule URL 740 has been downloaded to mobile device 104 from NFC station 106 via NFC connection 200.

Figure 8:
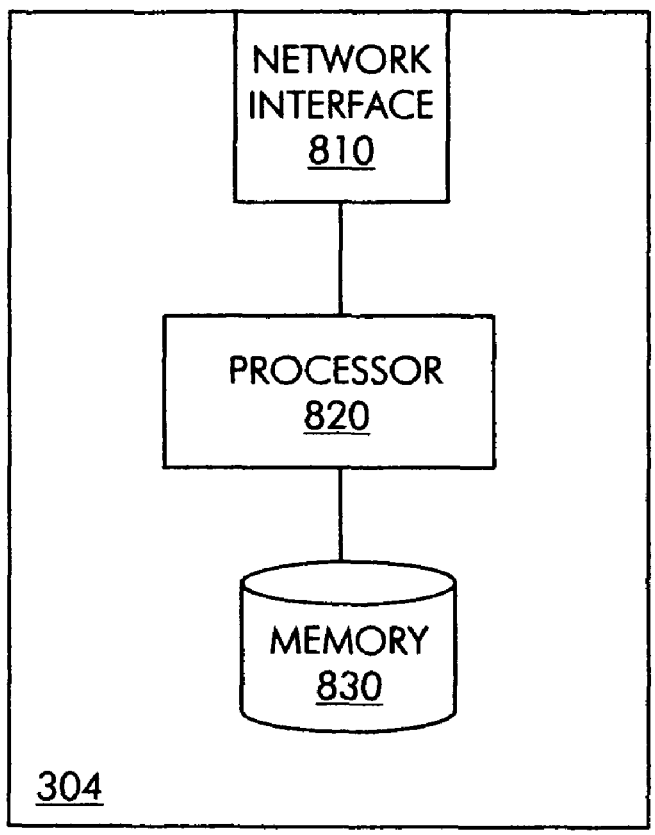
FIG. 8 shows hardware elements of a web server.

FIG. 8 shows hardware elements of web server 304. Web server 304 includes a network interface 810 and a memory 830, both of which are communicatively coupled with a processor 820.

Network interface 810 is a communication interface for transmitting and receiving data over the Internet 306. Network interface 810 may be, for example, a wired Ethernet interface.

Figure 9:
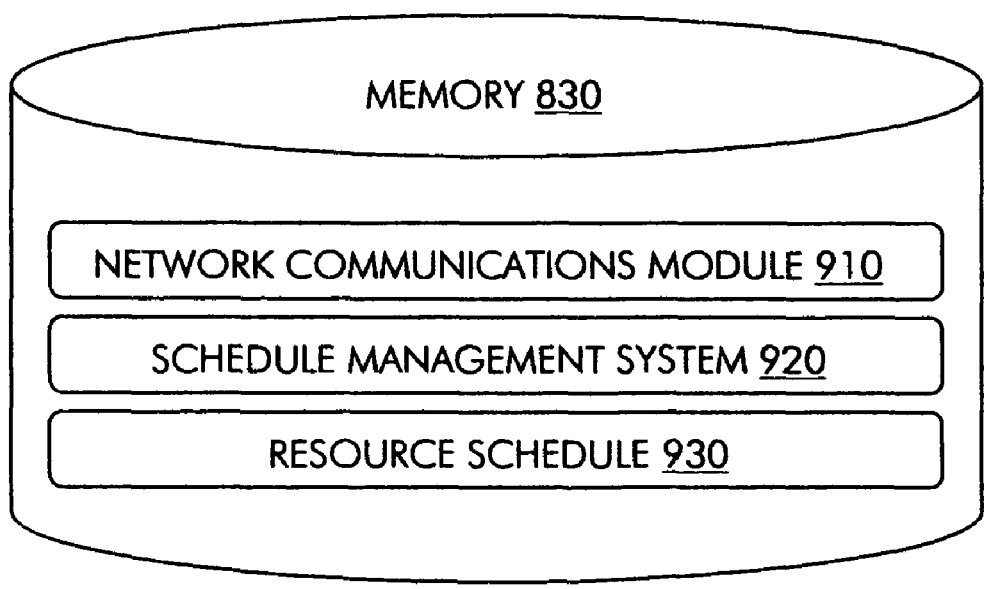
FIG. 9 shows software elements of a web server.

Processor 820 executes in software operations supported by web server 304. Turning to FIG. 9, software elements of web server 304 executable by processor 820 are shown to include a network communications module 910 and a schedule management system 920. Memory 830 stores software elements executable by processor 820. Memory 830 also includes resource schedule 930. Memory 830 includes one or more RAM and one or more ROM.

Network communications module 910 establishes, tearsdown and manages information flows over Internet 306 via network interface 810. Such flows include information exchanges between mobile device 104 and web server 304 in which resource schedule 930 is downloaded for viewing on mobile device 104 and resource schedule 930 is updated to reflect a reservation of shared resource 108 made by user 102 of mobile device 104.

Schedule management system 920 manages reservations of shared resource 108. Schedule management system 920 interacts with mobile device 104 and resource schedule 930 in reservation handling, including accepting a reservation request received from mobile device 104, issuing a reservation confirmation to mobile device 104 and updating resource schedule 930 to reflect the confirmed reservation.

Resource schedule 930 indicates times when shared resource 108 is available for reservation. Resource schedule 930 associates times of use with names of users, if any, who have reserved shared resource 108 at those times. In some embodiments, resource schedule 930 is downloaded to mobile device 104 with various times and associated names of users who have made reservations at those times. In other embodiments, resource schedule 930 is downloaded to mobile device 104 with various times and associated reserved/available status indications, but without names of users, in order to protect the identity of users from disclosure.

In some embodiments, memory 830 includes an authentication mechanism for validating user 102 and/or mobile device 104 before providing access to services of web server 304, including provision of resource schedule 930 and/or allowing user 102 to reserve shared resource 108 via update of resource schedule 930. Such an authentication mechanism on web server 304 may be used in addition to or in lieu of the authentication mechanism on NFC station 106.

Figure 10:
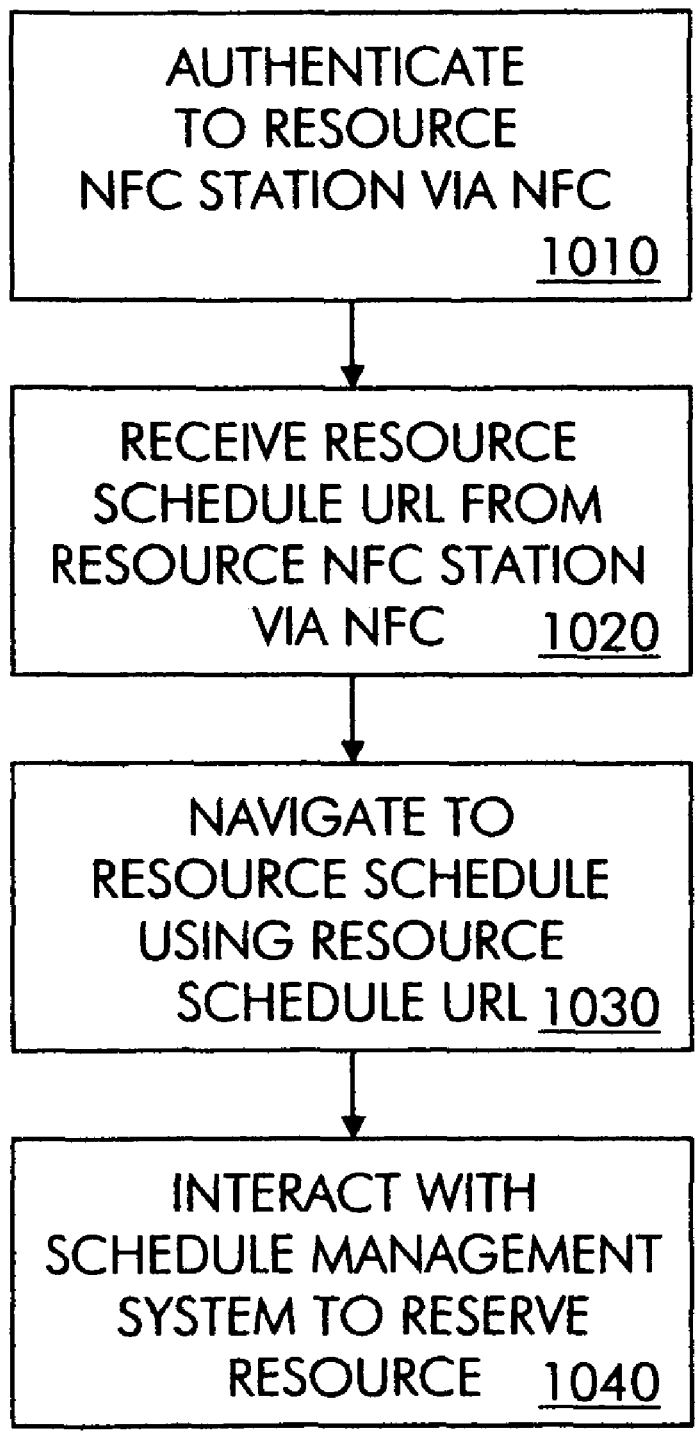
FIG. 10 shows a method for facilitating scheduling using a mobile device and NFC in some embodiments of the invention.

FIG. 10 shows a method for facilitating scheduling using mobile device 104 and NFC in some embodiments of the invention. User 102 who wishes to review a schedule for shared resource 108 and possibly reserve shared resource 108 brings his or her mobile device 104 into proximity with NFC station 106 that is associated with shared resource 108, whereby NFC connection 200 is established between mobile device 104 and NFC station 106. Mobile device 104 authenticates to NFC station 106 by uploading access credential 540 to NFC station 106, which validates access credential 540 (1010). Upon successful validation, NFC station 106 downloads to mobile device 104 resource schedule URL 740, which provides a link to a web page that has a resource schedule 930 for shared resource 108 (1020). Mobile device 104, invoking web browser 530 and using resource schedule URL 740, navigates to resource schedule 930 (1030), whereupon user 102 reviews resource schedule 930 on user interface 450. User 102 then interacts with schedule management system 920 to reserve shared resource 108 at a time when shared resource 108 is available and that is convenient for user 102 (1040).

Figure 11:
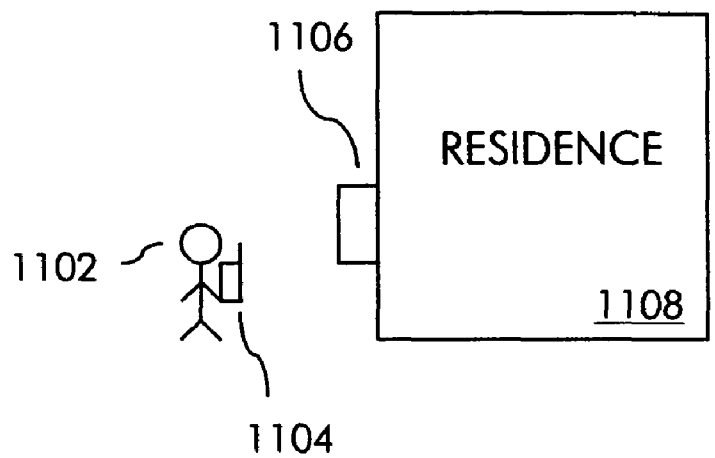
FIG. 11 shows a NFC station that is collocated with a residence of a social contact of a mobile device user.
Figure 12:
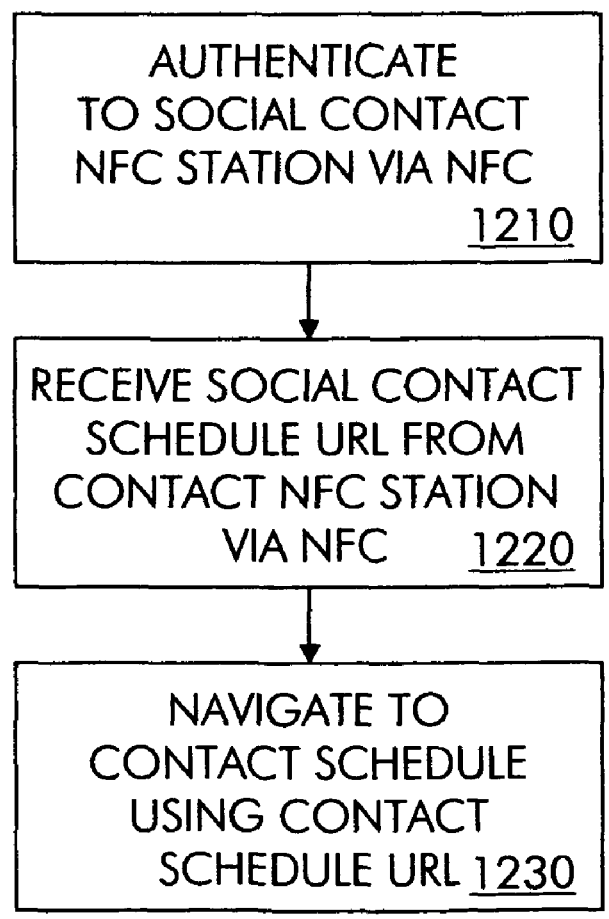
FIG. 12 shows a method for facilitating scheduling using a mobile device and NFC in other embodiments of the invention.

A method and system for facilitating scheduling using a mobile device and NFC may alternatively be used to discover the schedule of a social contact of a user. FIG. 11 shows a residence 1108 where a social contact of a user 1102 lives. A NFC station 1106 is collocated with residence 1108. NFC station 1106 is shown mounted to the exterior of residence 1108, but in other embodiments an NFC station may be freestanding near residence 1108. User 1102, for example, a student who has biked or walked to residence 1108 only to discover that the social contact is not home, wishes to know the schedule of the social contact. User 1102 possesses an Internet-capable and NFC-capable mobile device 1104, for example, a cell phone, PDA or notebook computer. Turning to FIG. 12, a method for using mobile device 1104 and NFC to learn the schedule of the social contact in these embodiments of the invention is shown. User 1102 brings his or her mobile device 1104 into proximity with NFC station 1106 that is associated with residence 1108, whereby an NFC connection is established between mobile device 1104 and NFC station 1106. Mobile device 1104 authenticates to NFC station 1106 by uploading an access credential to NFC station 1106, which validates the access credential (1210). Upon successful validation, NFC station 1106 downloads to mobile device 1104 a social contact schedule URL, which provides a link to a web page that has a schedule for the social contact (1220). Mobile device 1104, invoking a web browser on mobile device 1104 and using the social contact schedule URL, navigates to the schedule for the social contact, which is hosted on a web server (1230), whereupon user 1102 reviews the schedule on a user interface of mobile device 1104.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. A method for facilitating scheduling using a mobile device and near field communication (NFC), comprising the steps of:
    bringing a mobile device into proximity with a NFC station whereby a NFC connection is established;
    uploading from the mobile device to the NFC station via the NFC connection an access credential;
    downloading from the NFC station to the mobile device via the NFC connection a schedule web link for an entity;
    downloading to the mobile device a schedule web page for the entity using the schedule web link; and
    displaying on the mobile device the schedule web page,
    wherein the access credential is a security credential identifying at least one of the mobile device or a user of the mobile device as authorized to access the schedule web link,
    wherein the schedule web link is a Uniform Resource Locator (URL) identifying a network location of the schedule web page remote from the NFC station, and
    wherein the schedule web page contains a schedule for the entity.

2. The method of claim 1, wherein the NFC station and the entity are collocated.

3. The method of claim 1, wherein the entity is a shared resource.

4. The method of claim 3, wherein the schedule web page indicates times when the shared resource is available for reservation.

5. The method of claim 3, further comprising the step of uploading from the mobile device a reservation request for the shared resource.

6. The method of claim 3, wherein the shared resource is one of a study room, exercise facility, lab facility, recreational facility, computing resource, counseling resource, library resource, technical support resource, tutoring resource or training resource.

7. The method of claim 1, wherein the entity is a social contact of a user of the mobile device.

8. A mobile device, comprising:
- a NFC interface;
- a wireless network interface;
- a user interface; and
- a processor communicatively coupled with the NFC interface, the wireless network interface and the user interface, wherein under control of the processor the mobile device uploads to an NFC station via the NFC interface an access credential and displays on the user interface a schedule web page for an entity downloaded via the wireless network interface using a schedule web link for the entity downloaded from the NFC station via the NFC interface,
- wherein the access credential is a security credential identifying at least one of the mobile device or a user of the mobile device as authorized to access the schedule web link,
- wherein the schedule web link is a URL identifying a network location of the schedule web page remote from the NFC station, and
- wherein the schedule web page contains a schedule for the entity.

9. The mobile device of claim 8, wherein the NFC station and the entity are collocated.

10. The mobile device of claim 8, wherein under control of the processor the mobile device uploads via the wireless network interface a request to reserve the entity.

11. The mobile device of claim 8, wherein the entity is a shared resource.

12. The mobile device of claim 8, wherein the entity is a social contact of a user of the mobile device.

13. A NFC station, comprising:
- a NFC interface; and
- a processor communicatively coupled with the NFC interface, wherein the NFC station uploads from a mobile device via the NFC interface an access credential, under control of the processor validates the access credential, and downloads to the mobile device via the NFC interface a schedule web link that provides a link to a schedule web page for an entity collocated with the NFC station,
- wherein the access credential is a security credential identifying at least one of the mobile device or a user of the mobile device as authorized to access the schedule web link,
- wherein the schedule web link is a URL identifying a network location of the schedule web page remote from the NFC station, and
- wherein the schedule web page contains a schedule for the entity.

14. The NFC station of claim 13, wherein the entity is one of a shared resource or a social contact of a user of the mobile device.

* * * * *